Feb. 26, 1929.      1,703,777
F. E. PERNOT
MEANS FOR LAYING AND PICKING UP SUBMARINE CABLES AND THE LIKE
Filed Feb. 1, 1923      8 Sheets-Sheet 1

INVENTOR.
Frederick Eugene Pernot
BY
John S. Barker
ATTORNEY.

Feb. 26, 1929.  1,703,777
F. E. PERNOT
MEANS FOR LAYING AND PICKING UP SUBMARINE CABLES AND THE LIKE
Filed Feb. 1, 1923  8 Sheets-Sheet 2

Feb. 26, 1929.　　　　　　　　　　　　　　1,703,777
F. E. PERNOT
MEANS FOR LAYING AND PICKING UP SUBMARINE CABLES AND THE LIKE
Filed Feb. 1, 1923　　　8 Sheets-Sheet 3

INVENTOR
Frederick Eugene Pernot
By John S. Barker
Atty

Feb. 26, 1929. 1,703,777
F. E. PERNOT
MEANS FOR LAYING AND PICKING UP SUBMARINE CABLES AND THE LIKE
Filed Feb. 1, 1923 8 Sheets-Sheet 4

INVENTOR
Frederick Eugene Pernot
By John S. Barker
Atty

Feb. 26, 1929. 1,703,777
F. E. PERNOT
MEANS FOR LAYING AND PICKING UP SUBMARINE CABLES AND THE LIKE
Filed Feb. 1, 1923   8 Sheets-Sheet 5

INVENTOR
Frederick Eugene Pernot
By John S. Backer
Atty

Feb. 26, 1929.

F. E. PERNOT

1,703,777

MEANS FOR LAYING AND PICKING UP SUBMARINE CABLES AND THE LIKE

Filed Feb. 1, 1923

INVENTOR
Frederick Eugene Pernot
By John S. Barker, Atty

Feb. 26, 1929.  
F. E. PERNOT  
1,703,777  
MEANS FOR LAYING AND PICKING UP SUBMARINE CABLES AND THE LIKE  
Filed Feb. 1, 1923      8 Sheets-Sheet 8

INVENTOR  
Frederick Eugene Pernot  
By John S. Barker

Patented Feb. 26, 1929.

1,703,777

UNITED STATES PATENT OFFICE.

FREDERICK EUGENE PERNOT, OF LONDON, ENGLAND.

MEANS FOR LAYING AND PICKING UP SUBMARINE CABLES AND THE LIKE.

Application filed February 1, 1923, Serial No. 616,451, and in Great Britain February 3, 1922.

The present invention has reference particularly to new or improved means for laying and picking up submarine cables and the like, and is applicable generally to tasks of a similar nature. The object of the present invention is to provide means whereby cables containing discontinuities or irregularities along their length can be conveniently and effectively laid and picked up.

It is well known in the art of cable engineering that a great gain in the efficiency of submarine cables can be secured by introducing inductive loading coils into the cable at suitable intervals, such intervals varying from one or two to twenty or more miles. The difficulty of handling cables containing such loadings, or "lumps" has heretofore prevented the general use of such inductive loading, however. Loadings of adequate size may appear in either a single concentrated massive lump of weight up to possibly one thousand pounds or more, or of a length of cable of considerably increased diameter extending for distances of from a few rods to a few miles in length. In either case, i. e. the single concentrated heavy lump or the short length of increased diameter cable, difficulty has been found in carrying the cable from or to the storage tanks of the ship and laying or picking up the cable around the drums, sheaves, etc. as at present used for controlling the tension under which the cable is paid out. This tension is normally of the order of magnitude from one to ten tons. It is the purpose of the present invention to overcome this difficulty.

In this specification the term lump will be used to refer to the complete structure associated with a concentrated loading element. It is a term current in practical cable engineering and serves conveniently to distinguish between smoothly distributed loading (as by a continuous whipping of iron wire) and concentrated loading which requires mounting in some form of container different from the cable in order to ensure mechanical strength and protection. Furthermore, things other than inductive loading coils may be contained within the lump, as for instance it has been proposed in certain cases to connect condensers to the cable at frequent intervals.

The principal feature of the present invention resides in the provision, for laying or picking up submarine cables and the like, of an endless band or loop of belt, link chain, or the like for effectually moving with the cable to or from the storage tanks therefor and for maintaining the proper control of or tension in the cable.

A further feature of the invention is the provision of clamping mechanism or devices for holding the cable along one side of the loop thus enabling the proper control of the cable to be exercised by the loop.

A further feature of the invention resides in causing the braking or driving action which eventually controls the cable to be exerted by ordinary or usual devices through the medium of the rotating members involved in support of the loop.

Subsidiary features of the invention are found in the provision of automatic means for opening and closing the before-mentioned clamps at the proper points in the motion of the loop so that the cable is controlled in the manner desired:

In the provision of guiding means capable of transporting the cable and lumps from the storage tanks to the control band or loop and thence overboard (or the reverse in the picking up process).

In the provision of auxiliary tension and guiding means to ensure that the cable always enters the loop clamps properly and to arrest the motion of the cable in the case of failure of any part of the various devices.

In the provision of automatic means for ensuring that the auxiliary guiding and tension device opens to permit the passage of a lump through it.

A still further feature of the invention resides in the method of disposing the guiding means for conveying cable and lumps to the control band with reference to the storage tanks in such a manner that the lumps can be stowed outside of the tank and put into position for paying out before such paying out actually takes place.

With the above and other objects in view, the systems for accomplishing the desired results as described are illustrated in connection with the attached drawings, wherein:—

Figure 1:
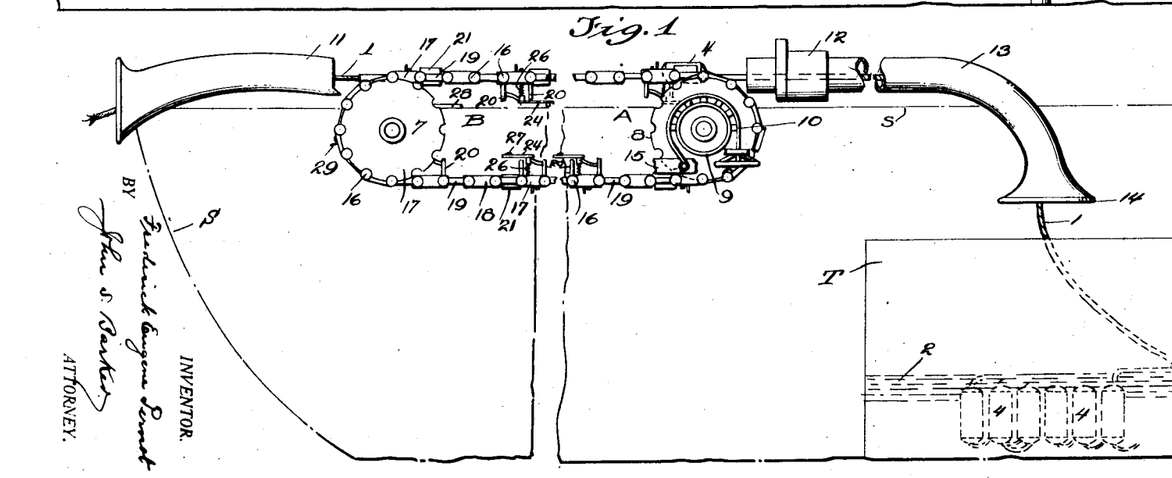
Fig. 1 is a view in side elevation, largely diagrammatic, illustrative of the invention.

In Figure 1, which is a view of a complete system, the dotted line at S represents the stern of a ship over which cable containing lumps to be paid out, s indicates the deck line of the ship and T the tank in which the cable is contained. The cable passing from the cable tank T to the stern of the ship is represented at 1 and the coiled cable within the tank is shown at 2. 4 represents lumps connected into the cable 2 and stored in the centre of the coiled cable preceding paying out.

The principal feature of the invention is embodied in the device for imparting tension to the cable during the paying out process. An articulated chain carrying clamping device passes over sprockets 7 and 8.

Sprocket 8 is equipped with brake gear such as is well known in the art or of any suitable type such as is illustrated by the brake drum 9 and brake band 10. The clamping devices of the chain 5 grip the cable and transfer the tension therein to the chain or band and thence through the sprocket 8 to the brakes 9 and 10. Automatic means cause the clamps to close on the cable at a position such as at A and to open at a position B thus allowing the cable to pass freely off of the chain and through suitable guiding means such as the tube 11 to and over the stern of the ship. Auxiliary guiding and holding apparatus is provided at 12 in order to ensure the cable entering properly into the clamps of the chain. In its passage from the tank T to the device 12 the cable and lumps are conveniently carried through a tube 13 which is so arranged that the lumps on leaving the tank can readily enter it, as by the bell mouth 14.

Figure 2:
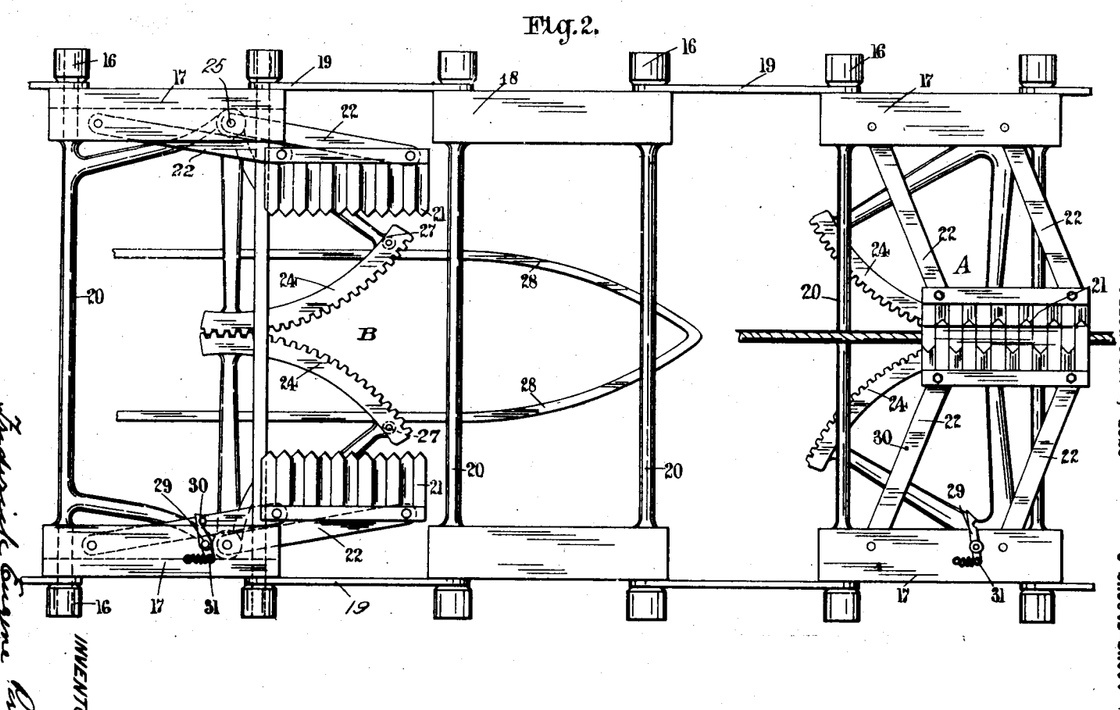
Fig. 2 shows in plan a fractional part of the preferred form of endless band with the clamping mechanism.
Figure 3:
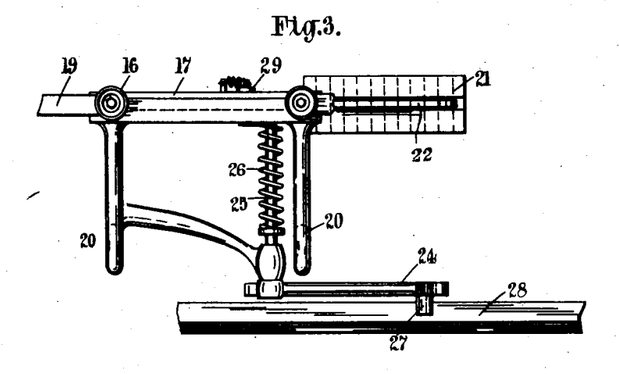
Fig. 3 shows a side elevation of one of the links of the chain with the clamping mechanism.
Figure 4:
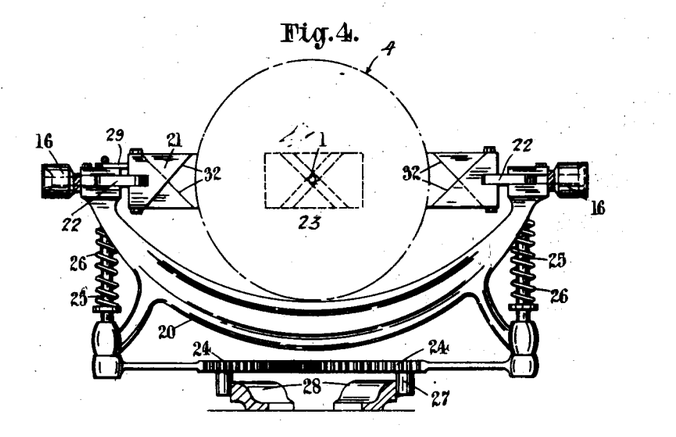
Fig. 4 shows an end elevation of the same.

Figure 2 is a plan view of the preferred type of the articulated chain and clamp of Figure 1. Figures 3 and 4 are side and end elevations respectively of the open clamp and link of Figure 2. These three figures are therefore to be read together and parts are correspondingly numbered throughout.

The sprocket wheels 7 and 8 in Figure 1 comprise in each case a pair of wheels mounted on the same shaft and the serrations or sprockets 15 of these wheels engage with the projecting rollers 16 of the links, which are also shown as 16 in Figures 2, 3, 4, and 19.

Figure 19:
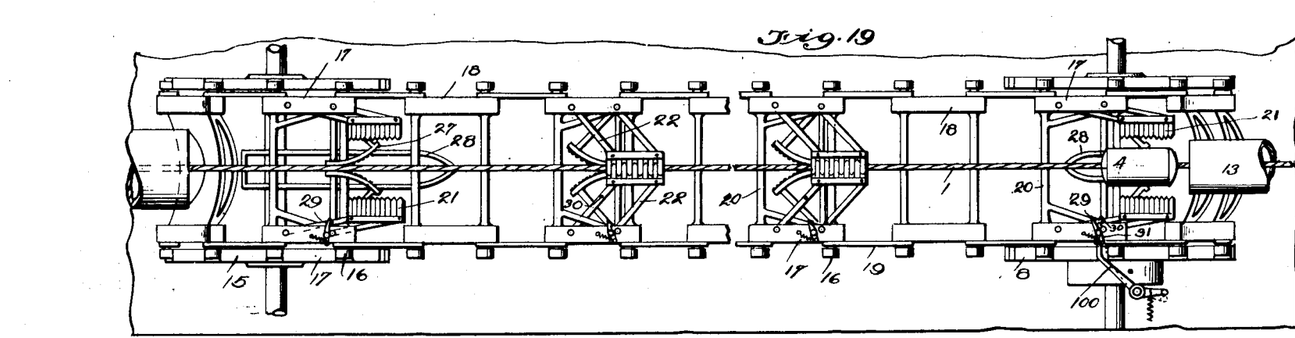
Fig. 19 is a broken plan view of the apparatus illustrated in Fig. 2.

The link chain in Figs. 2 and 19 contains three distinct elementary links: viz.

Clamping links 17, blank or idle links 18 and connecting straps or links 19. It is not necessary that a cable clamp be provided of every link, hence the introduction of the idle links 18. Both clamp and idle links contain cross frames 20 adapted to support the lump as shown in dotted lines at three in Figure 4.

The clamps comprise a number of intermeshing jaws 21 arranged so that they exert their compressing force on the cable in a manner least likely to deform the cable structure.

The link frames 17 and clamping jaws 21 are joined by pivoted arms 22 so that in opening and closing the jaws 21 always remain parallel to each other.

The dotted lines 23 in Figure 4 show how the jaws close on the cable 1.

When the jaws are closed as shown in the right hand link of Figure 2, the angle of the arms 22 is such that the force exerted on the jaws by the cable forces the jaws to clamp the cable still more firmly. In order to ensure the jaws always meshing in the proper manner, they are connected, through the arms 22, shafts 25 to which the arms are connected and intermeshing gear segments 24 mounted on the shafts 25. Springs as at 26 serve to force the jaws into a closed position unless they are maintained open by further devices.

Studs 27 are affixed to the gear segments 24 act on guide rails 28, and the latter are suitably supported by any suitable frame part of the apparatus and disposed in such a fashion that the jaws are forced open or allowed to close at any desired points in the circuit of the link chain for the purpose described in connection with Figure 1.

In the passage of a lump along the chain it is undesirable that the clamps immediately preceding and opposite the lump close into engagement with the lump. A catch 29 pivotally supported on a clamping link 17 is therefore provided to engage with a pin 30 on the member 22 to prevent the jaws from closing even though the guides 28 normally would allow them to do so. The rearward projection 31 of these catches is arranged to strike against a stop 100, shown in Fig. 19, in the passage of the link chain, thus releasing the jaws. This stop is made subject to manual control so that when a lump appears it can be withdrawn, thus leaving the catch in place and preventing the jaws closing on the lump.

In brief, the operation of the clamping system is this: Sometime before the cable leaves the link chain the jaws are forced open by the guide rails 28. The catches 29 hold them open during their passage along the lower side of the loop in Figure 1 and until they come into position as at A on the cable again. Then the catch 29 is released and further guide rails 28 shown at the right in Fig. 19 allow the jaws to close gently into place on the cable, held there by the springs 26, and jammed firmly against the cable by the tension in the cable itself. These operations all take place automatically so that even during the passage of a lump there is no need for slowing down the ship or otherwise interrupting the paying out process.

Figure 5:
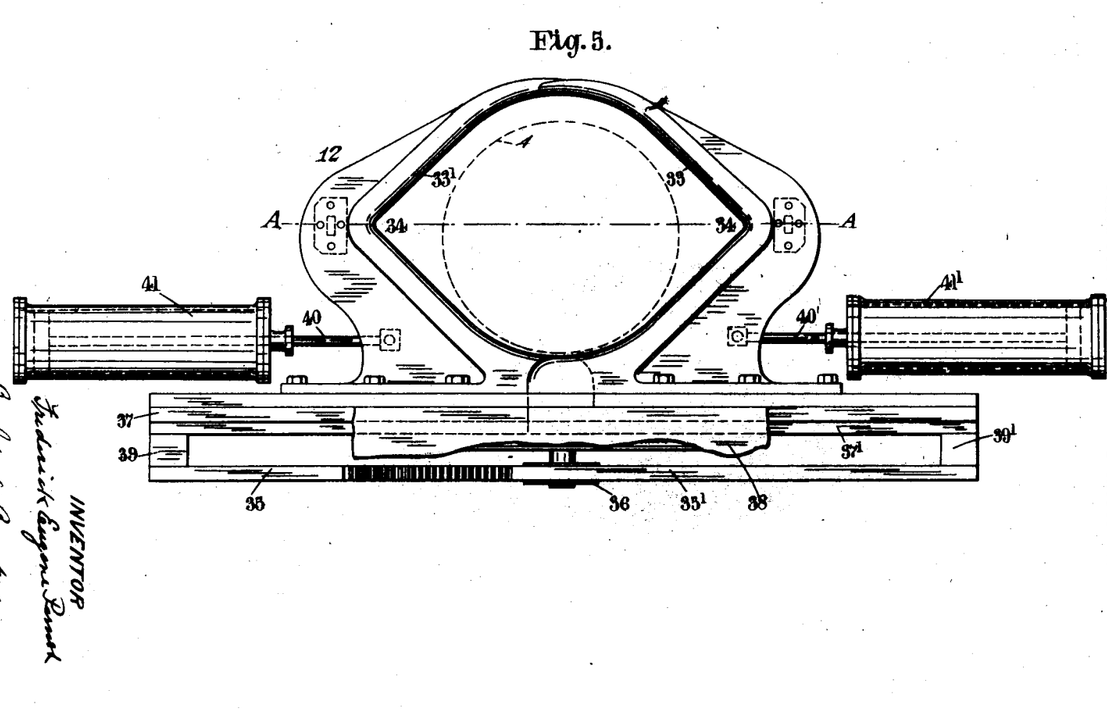
Fig. 5 is an end elevation of the auxiliary guiding and holding device when in the open position.
Figure 6:
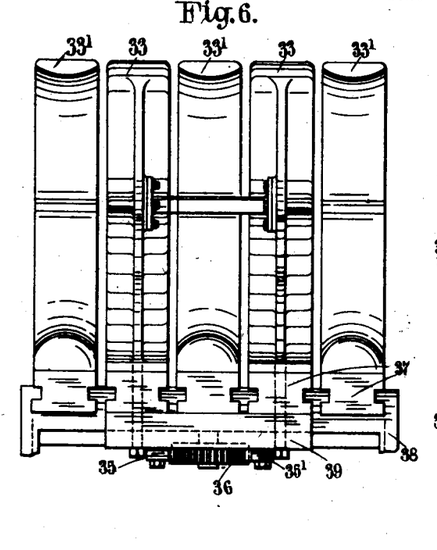
Fig. 6 shows a side elevation of the auxiliary guiding and holding device.
Figure 7:
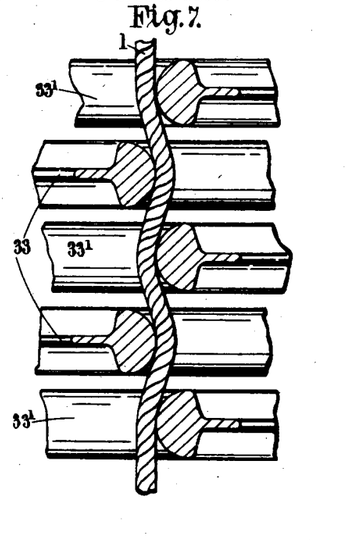
Fig. 7 shows the manner in which the auxiliary guiding and holding device acts on the cable, the same being a section taken on the line A—A of Fig. 5, the cable-engaging jaws being closed.

Now, when the clamps come up into position to close upon the cable it is essential that the cable be in such a position that it will fall within the V notch 32 of the clamps (Fig. 4). The mechanism 12 of Figure 1, illustrated in detail in Figs. 5, 6, and 7, is provided to hold the cable in the proper place and impart a sufficient tension previous to entry within the link clamps to prevent whipping about during the motion of the ship. The mechanism 12 is also adapted to holding the cable firmly in the event of the brakes failing or the link chain breaking, or any other mishap.

Figure 5 is an end elevation and Figure 6 a side elevation of this guiding and holding device. It comprises, essentially, intermeshing V shaped guides 33 and 33' which, when open, allow sufficient room for the passage of a lump, and when closed force the cable into position as at 34 at the bottom of the V's and by an application of force in closing can be so positioned as to cause the cable 1 to take a zig-zag path as shown in Figure 7. The natural stiffness of the cable causes it to move past the staggered jaws of Figure 7 with difficulty, and, by properly spacing the jaws and forcing them together sufficiently, the cable can be tightly clamped.

The position occupied by a lump in passing through the jaws is indicated by the dotted circle 3 in Figure 5. In their opening and closing motions it is essential that the jaws move equally, otherwise the cable might be held to one side of the centre. To ensure this, two racks 35 and 35' are attached to the respective jaw slides 37 and 37', and by engaging opposite sides of a toothed pinion 36 ensure equal and opposite motions of the jaws. The jaw slides 37 and 37' work in fixed ways or guides 38. Cross members 39 and 39' attach the respective jaws and cause them to move as complete units. The jaws are conveniently moved in and out by steam pistons 40 and 40' working in cylinders 41 and 41' in a well known manner, as indicated in Figure 5.

Figure 8:
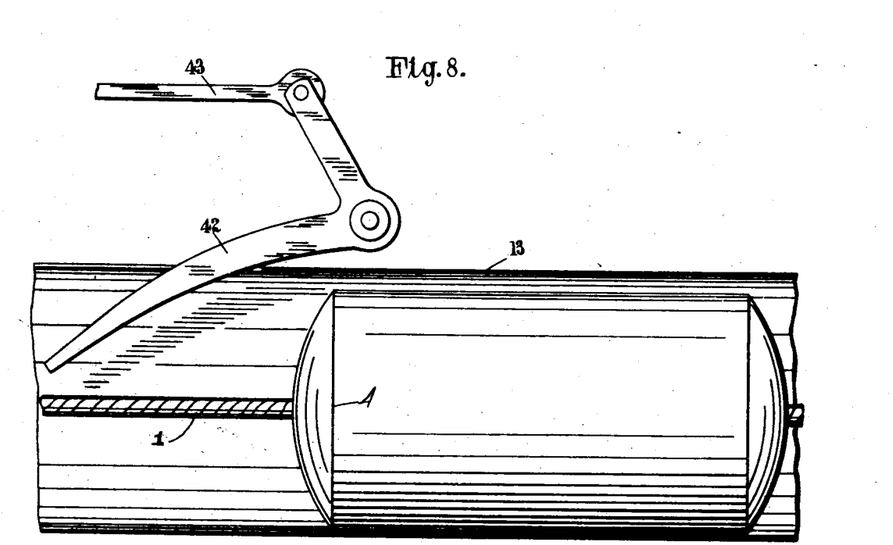
Fig. 8 shows a method whereby the mechanism controlling the auxiliary guiding and holding device is automatically actuated by the passage of a load or lump.

The valve controlling the steam cylinders may be actuated by hand, but in order to make it impossible for the jaws to remain closed before an oncoming lump a bell crank and lever arm as shown by 42 in Figure 8 may be provided. By mounting this in the tube 13 just ahead of the auxiliary guiding and holding device the passage of the lump 3 moves the lever 42 and through the medium of the rod or member 43 actuates the valve in such a manner as to cause the jaws to open.

The above completes the description of the general arrangement as shown in Figure 1 for a complete system, and the various designs shown are such as to accommodate cylindrical lumps, with the cable located centrally at both ends.

Such a cable arrangement makes it necessary for the clamps mounted on the link chain to open very widely in order to accommodate the lump. Figure 1 also shows the lumps stored in the centre of the cable tank, in such a manner that the outgoing cable must lift the lump up to the tube through which it passes. Certain modifications may be made in these details, lending themselves, perhaps, to easier execution in practice.

Figures 9, 9A, 10:
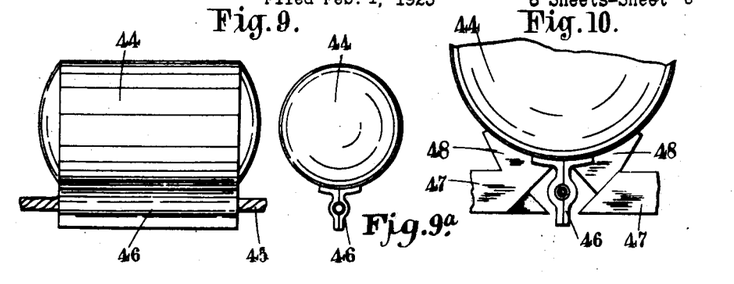
Fig. 9 shows in side elevation a particular method of connecting a lump into the cable, and Fig. 9ª is an end elevation of the arrangement illustrated in Fig. 9.
Fig. 10 shows how the jaws of the clamping mechanism on the endless band or chain accommodate themselves to such a cable and lump combination as is illustrated in Figs. 9 and 9ª.

Figs. 9 and 9ª show the cable 45 taken into a projecting rib 46 along one side of the lump 44. This makes possible the use of a smaller and simpler link clamp as shown in Figure 10. In this figure the jaws 47 need only open sufficiently to admit the cable and fin 46 of the lump 44, while projections 48 on the jaws support the lump.

Figure 11:
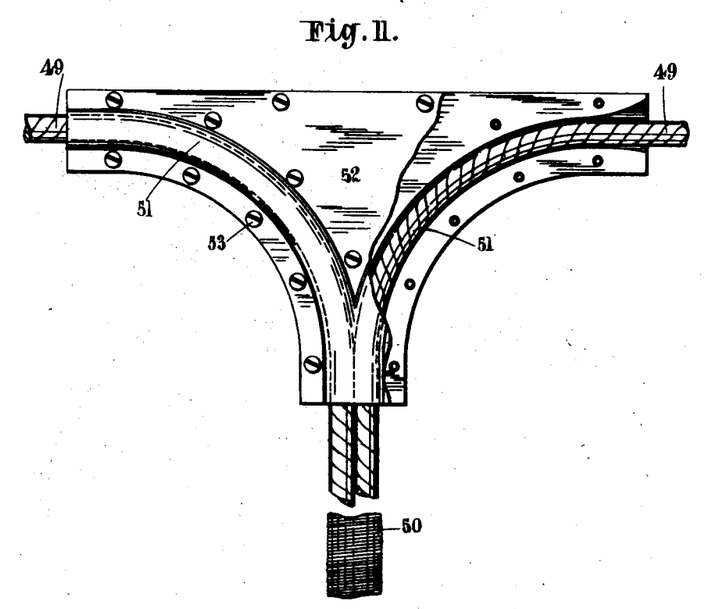
Fig. 11 shows in plan a method of introducing a bight into the cable.
Figure 12:
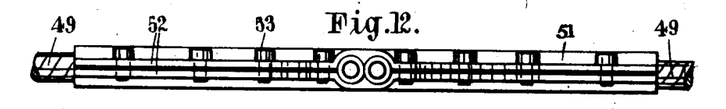
Fig. 12 is a side view of the same.

Figures 11 and 12 show two views of a method whereby the continuous run of the cable 49 is preserved as far as mechanical strength is concerned but wherein a bight 50 is formed in the cable for connection to a loading unit.

In these figures the cable 49 passes through circular grooves 51 in the clamping plates 52. The latter are clamped together by bolts, screws, rivets or the like, 53. As seen in Figure 12 such a construction is but little thicker than the cable itself, and therefore the link clamp construction is made simpler.

Figure 13:
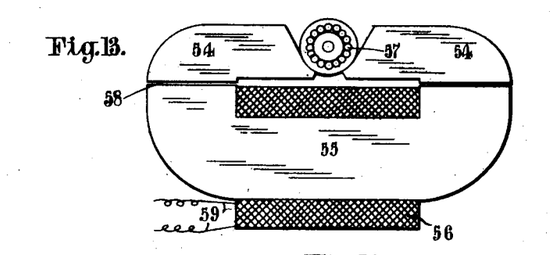
Fig. 13 shows the magnetic circuit involved in a magnetic clamping device, as an alternative to mechanically controlled clamps.

Figure 13 shows a sectional view of a magnetic clamping device. The magnetic circuit between the poles 54 of an electromagnet is completed by the steel armour 57 of the cable. The cable is thus drawn forcibly into the groove between the poles, and the friction acts to prevent motion along its length. The non-magnetic serving outside of the armour wire prevents this clamping method from being as effective as it otherwise would be. Only the pole pieces 54 need be carried by the link chain. The core of the magnet 55 and the winding 56 can be fixed in place, the magnetic circuit being completed between fixed core and movable pole pieces through a small air gap 58. By making the length of this gap small and its area great the effectiveness of the clamp is not materially diminished. The terminals 59 of the winding are to be supplied from any suitable electric source.

Figure 14:
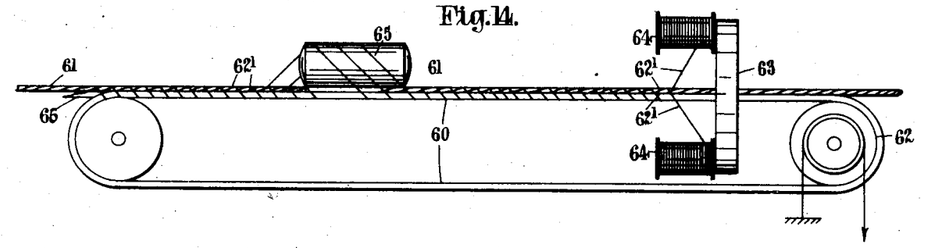
Fig. 14 shows another method of clamping the cable to the endless band, in this case by putting a serving continuously around both cable and endless band.

Figure 14 shows another method of making the cable 61 fast to the continuous chain or band which passes around the brake drum 62. The cable lies along the band and a continuous whipping 62' is put around the two by the device 63. This device 63 carries reels 64 of fine wire or cord and rotates about the cable and band. Such a device is well known in the art of cable and rope manufacture, and the only peculiarity necessary to the present use is that its inside opening be large enough to let the lump 65 pass through it. When the lump passes through the whipping about it is of course distorted, but since it is only a small fraction of the total the holding power is not materially reduced. Preferably two whipping machines are provided so that the reels on one may be renewed while the other continues in operation. Where the cable leaves the band a knife 66 or other suitable device is to be provided to sever the whipping or, alternatively, an unwinding machine may be provided if it is desired to recover the whipping material.

Figures 15, 16:
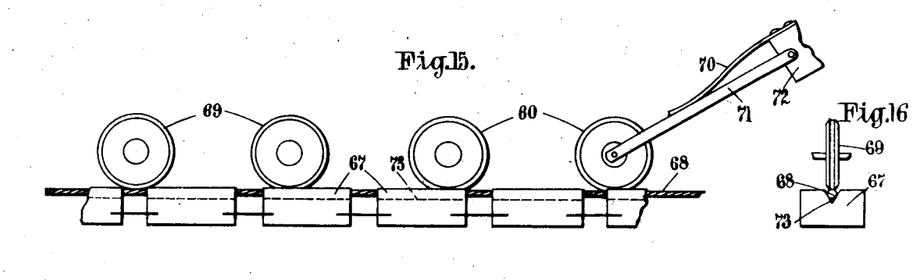
Fig. 15 shows a still further method of making the cable transmit its tension to the endless band by means of idle wheels pressing the cable into a groove in the band or links of the band.
Fig. 16 is an end view of the same.

Figures 15 and 16 are respectively side and end elevations of a still further method of attaching the cable to the continuous chain or band. Here the chain consists of a number of articulated blocks 67 each containing a longitudinal V groove 73 into which the cable 68 is pressed by idler wheels 69. These wheels are mounted on arms 71 which are pivoted at 72 in such a manner that the wheels may rise to permit the passage of a lump or junction block like that shown in Figure 11. A spring 70 or other suitable mechanism presses the wheels against the cable, and the friction of the latter within the V groove prevents slipping.

Figure 17:
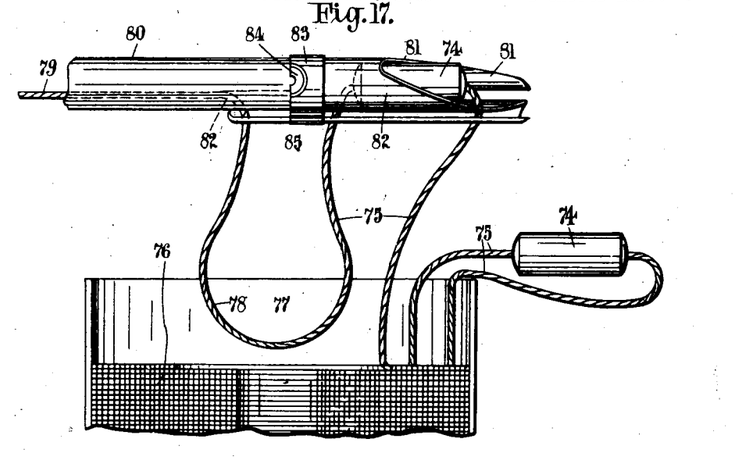
Fig. 17 shows a method of arranging the cable and lumps at the tank so that the lumps can be stowed outside of the tank.

In some cases it may not be desirable to store the lumps in the centre of tank, or to allow the lumps to be lifted up through the tube by the outgoing cable. Figure 17 shows how both of these features may be avoided. A lump 74 is contained in a bight of the cable 75 brought from the outside of the coil of cable 76 in the tank 77. The tube 80 through which the outgoing section 79 of the cable passes is provided with a long open end 81 and a slot 82 which terminates at 82'. A lump 74 can be hoisted from its stowage place and positioned in the open end 81 of the tube as shown, ready to be pulled through when the section 78 of the cable preceding it has all been taken from the tank. The bight of cable 75 permits placing the lump 74 in the position indicated, and this bight passes downwards through the slot 82. The slot can be nicely rounded at its termination 82' over which the cable normally passes, and intermediate the passage of lumps the slot can be closed rearwardly by the slotted rotating band 83 being turned until the bell mouth 84 covers the slot. This would eliminate any chance of the outgoing section 78 of the cable fouling the bight 75. When the cable preceding the lump 74 that may be resting in the open end 81 of the tube is nearly exhausted, then the band 83 must be turned until its slot 85 coincides with the slot 82 in the tube, so that the loop 78 in the cable will be pulled up and disappear within the tube. Thereupon the lump 74 is pulled ahead, the right hand part of the bight 75 takes the position shown at 78 the slot 82 can be closed by the ring 83, and another lump 74 hoisted up into place within the tube ready for the foregoing operations to be repeated.

Figure 18:
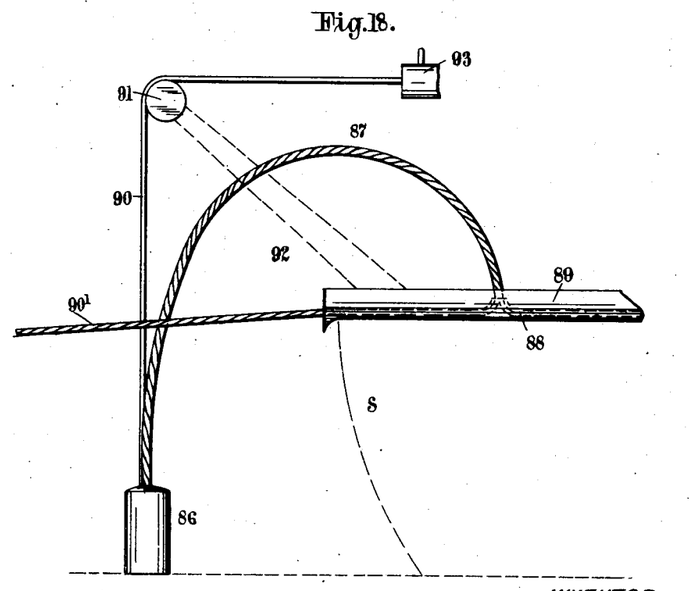
Fig. 18 shows how a lump placed at the end of a bight in the cable can be lowered over the stern of the ship in paying out.

Finally, if it is desired not to pull the lump through the tube at all the lump at 74 in Figure 17 may be replaced by a connection or junction block as shown in Figure 11 with the lump connected to the end of the bight 50. A slot along the top of the tube 80 in Figure 17 would allow the bight projecting from the junction block to pass along through it. In such a case the bight 87 Fig. 18 should be made long enough to permit carrying the lump right off and suspending it over the stern S of the ship as shown in Figure 18. The lump 86 is suspended by the rope 90 passing over a sheave 91 at the end of a supporting arm such as a crane 92. A winch is provided at 93 for lowering the lump as the junction block 88 moves through the slotted tube 89. When the outgoing cable 90' has pulled the junction block 88 clear of the ship, the winch is operated to allow the full weight of the lump to gradually come on the cable, and the supporting rope is then either cut or freed from the lump by any usual form of releasing hook.

This last method of operating frees all of the tension gear from the necessity of handling and passing the lump, and allows the lump to be got ready for lowering in a leisurely fashion. Since the lumps are spaced approximately four miles apart and the speed of laying is approximately 5 or 6 miles an hour, it is apparent that a lump passes only every 40 or 50 minutes.

All description has been limited to the continuous laying of cables because such application of the method is of by far the greatest importance. It is obvious, however, that if instead of a braking device a driving device be applied to the continuous chain or band, then the cable is picked up by merely reversing the operations previously described. In this connection attention is directed to my pending British application No. 20,188/22 "cable handling machinery," wherein braking and driving apparatus is described. Regarding the forms of lumps and methods whereby they are attached to or in the cable, reference is directed to pending British application No. 5,291/22 "new or improved methods of loading submarine cables."

I claim:—

1. In a mechanism for the laying and picking up of submarine cables, the combination with means for directing the cable overboard, of an endless band that supports a section of the cable and moves therewith and means for holding the cable in contact with the said band while the two are moving together.

2. In mechanism for the laying and picking up of submarine cables, an endless band, guiding means therefor, and means for holding the cable in contact with the band during its movement therewith.

3. In mechanism for the laying and picking up of submarine cables an endless band, guiding means therefor, means for holding successive lengths of cable in contact with said band and means for releasing the cable after being held in said contact.

4. In mechanism for the laying and picking up of submarine cables an endless band, means for holding the cable in contact with said band and means for causing said band to maintain the cable under proper tension.

5. In mechanism for the laying and picking up of submarine cables, means for directing the cable over board, an endless band, a section of which is in the path of the cable, means for holding the cable in contact with the band so the cable and band move together and means tending to retard the movements of the band whereby tension is applied to the cable.

6. In mechanism for the laying and picking up of submarine cables an endless band free to be moved, and clamps carried thereby, said clamps gripping the cable whereby the cable imparts movement to the band.

7. In mechanism for the laying and picking up of submarine cables an endless band free to be moved, clamps carried thereby, to engage with the cable, whereby the latter imparts motion to the band, successive clamps in movement accommodating successive lengths of cable and means for causing said clamps to grip the cable during movement therewith and means to cause release of the cable after the determination of the movement of the cable with the endless band.

8. In mechanism for the laying and picking up of submarine cables an endless band free to be moved, guides therefor, clamps carried by the band for engaging with the cable, whereby motion is imparted to the band by the cable, and opening and closing means for said clamps, successive lengths of cable accommodated within those clamps moving in the same direction as the cable, and successive clamps accommodating successive lengths of cable.

9. In mechanism for the laying and picking up of submarine cables an endless band free to be moved, guides therefor, such guides positioned within the band and at each extremity thereof, clamps carried by the band, said clamps gripping the cable whereby the cable imparts motion to the band, successive clamps gripping successive lengths of cable, said band operating to impart rotary motion to the guides and means for exerting a braking effort on said guides.

10. In mechanism for the laying and picking up of submarine cables, the combination with a storage tank for the cable and means for directing the cable overboard, of an endless band, clamps carried thereby, successive clamps gripping successive lengths of cable, and means for guiding said cable intermediate the band and storing tanks.

11. In mechanism for the laying and picking up of submarine cables an endless band, clamps carried thereby, said clamps comprising intermeshing jaws and said jaws gripping the cable.

12. In mechanism for the laying and picking up of submarine cables, the combination of means for directing the cable over board, an endless band free to be moved and having a portion located close to the path of the cable, clamps carried by the band comprising intermeshing jaws adapted to grip the cable, and automatically operating means for causing the jaws to engage with the cable and to release the same.

13. In mechanism for the laying and picking up of submarine cables an endless band, link frames carried by said band, clamping jaws gripping the cable, and pivoted arms connecting said jaws to said frames and said cable arranged to move said arms in such a direction as to cause the jaws to remain in gripping contact with the cable as it and the endless band move together.

14. In mechanism for the laying and picking up of submarine cables an endless band, link frames carried by said band, arms pivoted to said frames, jaws pivoted to said arms, said jaws gripping the cable and gear segments co-acting with said arms.

15. In mechanism for the laying and picking up of submarine cables an endless band, link frames carried by said band, arms pivoted to said frames, jaws pivoted to said arms, said jaws gripping the cable, gear segments co-acting with said arms and springs exerting an effort to close the jaws.

16. In mechanism for the laying and picking up of submarine cables an endless band, link frames carried by said band, arms pivoted to said frames, jaws pivoted to said arms, said jaws gripping the cable, gear segments co-acting with said arms, springs exerting an effort to close the jaws, studs affixed to the gear segments, and fixed guide rails, said studs bearing on the rails and said rails so disposed as to force open and allow the jaws to close, at any desired points in the circuit of the band.

17. Apparatus for laying and picking up cables containing discontinuities or irregularities along their length, comprising, in combination with storage tanks for the cable, an endless band, clamps carried thereby, said clamps gripping the cable, successive lengths of cable and means for guiding said cable intermediate the band and storage tanks.

18. Apparatus for the laying and picking up of cables containing irregularities along their length, comprising an endless band free to move and having a portion that parallels the course of the cable for a determined distance, clamps carried by the band arranged to grip the cable and also to permit the said irregularities of the cable to pass and means for guiding the cable before and after it reaches said band.

19. In mechanism for the laying and picking up of submarine cables an endless band, link frames carried by said band, arms pivoted to said frames, jaws pivoted to said arms, said jaws gripping the cable, gear segments co-acting with said arms, springs exerting an effort to close the jaws, studs affixed to the gear segments, fixed guide rails, said studs bearing on the rails, said rails controlling the opening and closing of said jaws, spring catches carried by said frames, pins carried by said arms, said catches engaging the pins when the jaws are open to the full extent, said jaws being incapable of closing while a pin and catch are in engagement, a stop for releasing said catch, and means for placing said stop into and out of operative position.

20. In mechanism for laying and picking up of submarine cables, the combination of means for directing the cable, an endless band free to move located adjacent to the course of the cable and means carried by the band and arranged to connect the cable with the band so that they move together, and mechanism for holding the cable in proper place and imparting tension thereto located close to the place where the cable comes into engagement with the band.

21. In mechanism for the laying and picking up of submarine cables carrying lumps along their length, and in combination with storage tanks for the cables, an endless band, clamps carried thereby, successive clamps gripping successive lengths of cable, cable guiding means intermediate said band, and the storage tanks, said means comprising a clamp situated at the extremity of a tube through which the cable passes to a clamp, a lever projecting into said tube, said lever being arranged to control said clamp, and to be operated by each lump in passing to open the clamp and allow of the passage of the lump through the clamp.

22. In mechanism for the laying and picking up of submarine cables carrying lumps which are connected to bights in the cables, an endless band, means for attaching the cable thereto, a tube for conveying the cable to the band, the said tube having an open end and a slot formed in said tube at the open end thereof and means for accommodating the lump in the open end of the tube immediately prior to being drawn along the tube with the cable.

23. In mechanism for the laying and picking up of submarine cables carrying lumps which are connected to bights in the cables, an endless band, means for attaching the cable thereto, a tube guiding the cable to the band, a slot in the tube, and means for suspending and lowering said lumps independent of the cable.

FREDERICK EUGENE PERNOT.